Patented Dec. 2, 1947

2,431,912

UNITED STATES PATENT OFFICE 2,431,912

SULFONYL NAPHTHOLS

Elkan R. Blout, Cambridge, and Richard S. Corley, Boston, Mass., assignors to Polaroid Corporation, Cambridge, Mass., a corporation of Delaware No Drawing. Application September 9, 1946, Serial No. 695,825

1 Claim. (Cl. 260—556)

This invention relates to organic chemical compounds and is directed to a new compound of the Mannich base type.

By this invention there is provided a new compound namely N-benzenesulfonyl-O-methyl-1-(2'-naphthylaminomethyl)-2-naphthol which may be represented by the following formula

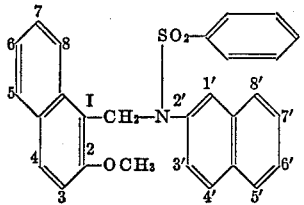

N-benzenesulfonyl-O-methyl-1-(2' - naphthylaminomethyl)-2-naphthol represented above, as a pure compound may take the form of colorless prisms exhibiting a melting point of about 175°–176° C. The new compound is insoluble in water and in cold dilute (2%) alcoholic alkali. It is soluble in hot acetone, in hot n-butanol, and in cold pyridine, and is slightly soluble in hot ethanol.

N-benzenesulfonyl-O-methyl-1-(2' - naphthylaminomethyl)-2-naphthol may be prepared by the treatment of O-methyl-1-(2'-naphthylaminomethyl)-2-naphthol with benzenesulfonyl chloride in cold pyridine solution. O-methyl-1-(2'-naphthylaminomethyl)-2-naphthol is disclosed and claimed in copending application Serial No. 695,823 filed on even date herewith.

EXAMPLE 1

N-benzenesulfonyl-O-methyl-1-(2' - naphthylaminomethyl)-2-naphthol may be prepared as follows:

To a solution of 1.20 grams of O-methyl-1-(2'-naphthylaminomethyl)-2-naphthol in 5 cc. of pyridine was added 0.75 cc. of benzenesulfonyl chloride. The solution was permitted to stand for about one-half hour. The crude product which was precipitated by the addition of water, was washed well and dried to give 1.65 grams of a bright yellow powder. The yellow powder was effectively decolorized by passing a benzene solution thereof through a short column of alumina and eluting with a small amount of a mixture of benzene and ether. Upon concentration there were obtained 1.55 grams of colorless crystals of N-benzenesulfonyl-O-methyl-1-(2' - naphthylaminomethyl)-2-naphthol which exhibited a melting point of about 174°–175° C.

For purposes of analysis the N-benzenesulfonyl-O-methyl-1-(2'-naphthylaminomethyl)-2-naphthol obtained as described in the above example was crystallized five times from acetone and dried in vacuo to give pure N-benzenesulfonyl-O-methyl-1-(2'- naphthylaminomethyl) - 2 - naphthol in the form of colorless prisms melting at about 175°–176° C.

The pure N-benzenesulfonyl-O-methyl-1-(2'-naphthylaminomethyl)-2-naphthol which has the empirical formula $C_{28}H_{23}NO_3S$ gave a qualitative test for sulfur and showed by microanalysis the presence of 74.41% carbon and 5.33% hydrogen as compared with the calculated values of 74.15% carbon and 5.11% hydrogen.

*Preparation of O-methyl-1-(2'-naphthylaminomethyl)-2-naphthol*

2-methoxy-1-naphthaldehyde was prepared according to the method of Barger and Starling, J. Chem. Soc. 99, 2301 (1911). To a solution of 4.20 grams of 2-methoxy-1-naphthylaldehyde in 20 cc. of hot methanol were added 3.20 grams of beta-naphthylamine in 20 cc. of methanol, and the mixture was boiled gently for 15 minutes. On cooling there were obtained 6.60 grams of impure (2-methoxy-1 - naphthaldehyde) - beta-naphthylimine. One crystallization from n-butanol gave 5.70 grams of yellow needles of (2-methoxy- 1 - naphthaldehyde) - beta - naphthylimine which exhibited a melting point of about 122°–123° C. (2-methoxy-1-naphthaldehyde)-beta-naphthylimine is disclosed and claimed in copending application Serial No. 695,822 filed on even date herewith.

A solution of 5.00 grams of (2-methoxy-1-naphthaldehyde)-beta-naphthylimine in 150 cc. of ethyl acetate and 1 cc. of acetic acid was hydrogenated at about 45 pounds per square inch pressure and at room temperature with 0.1 gram of Adams' platinum oxide catalyst. The reduction was complete in 15 minutes. The catalyst was filtered, care being taken not to permit the catalyst unnecessarily to be exposed to the atmosphere and to dry during this operation in order not adversely to affect the yield. The solvent was removed in vacuo at 40° C. to produce a light yellow crystalline residue. The residue was crystallized from ether to give 3.72 grams of nearly colorless needles of O-methyl-1-(2'-naphthylaminomethyl)-2-naphthol exhibiting a melting point of about 111°–112° C. O-methyl-1-(2'-naphthylaminomethyl)-2-naphthol is disclosed and claimed in copending application Serial No. 695,823 filed on even date herewith.

Since certain changes may be made in the above subject matter without departing from the scope of the invention herein involved, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

What is claimed is:

N-benzenesulfonyl-O-methyl-1-(2'-naphthyl- aminomethyl)-2-naphthol represented by the following formula:

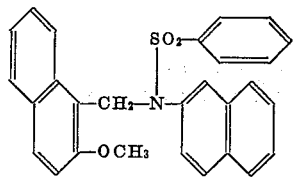

and which in the form of colorless prisms exhibits a melting point of about 175°–176° C.

ELKAN R. BLOUT.
RICHARD S. CORLEY.